Aug. 8, 1944.　　　　L. CONTRATTO　　　　2,355,512
MACHINE FOR MANUFACTURING SPLINTS FOR MATCHES
Filed Jan. 16, 1941　　　6 Sheets-Sheet 3

Inventor,
L. Contratto

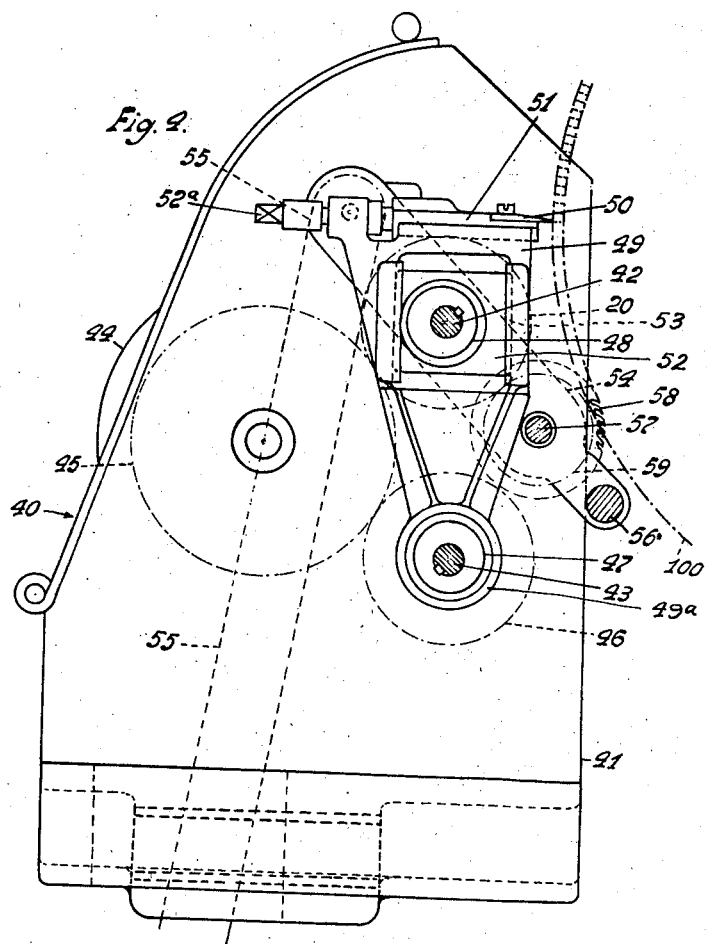

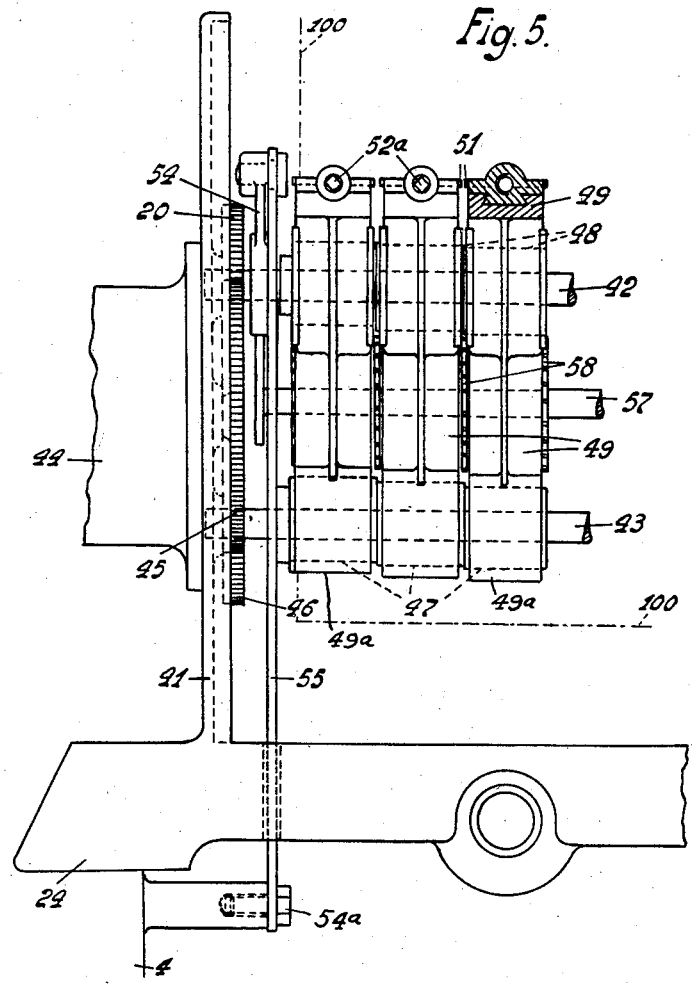

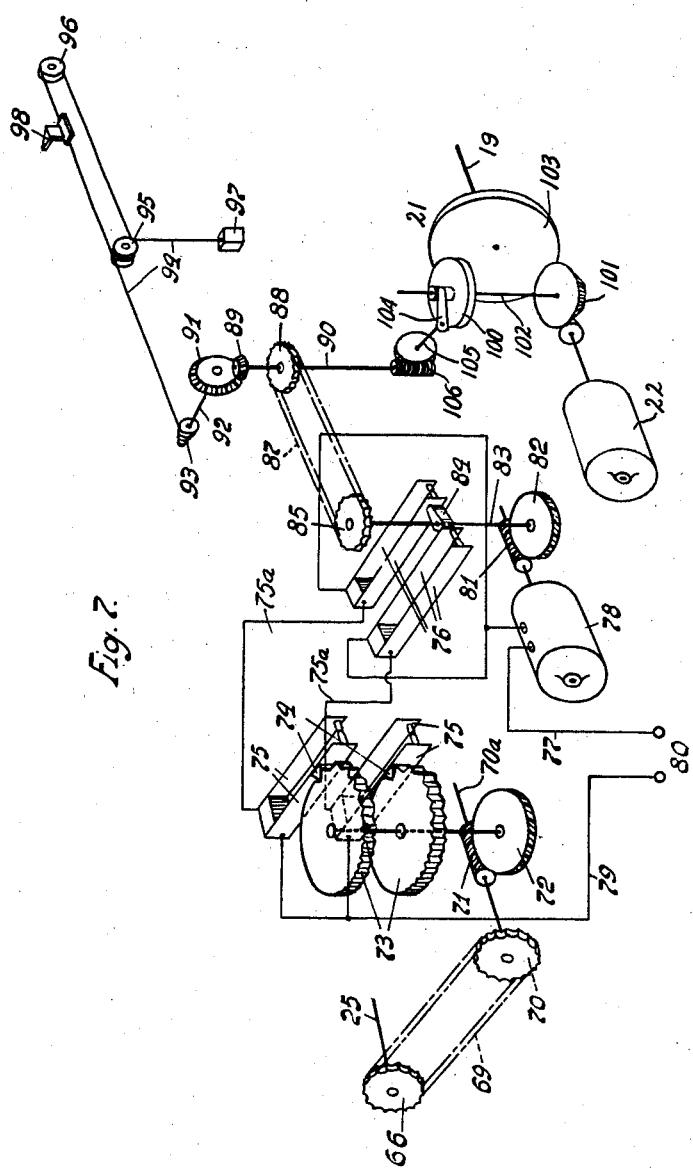

Patented Aug. 8, 1944

2,355,512

UNITED STATES PATENT OFFICE 2,355,512

MACHINE FOR MANUFACTURING SPLINTS FOR MATCHES

Lorenz Contratto, Sisikon, Switzerland

Application January 16, 1941, Serial No. 374,761
In Switzerland January 13, 1940

10 Claims. (Cl. 144—50)

The present invention relates to a machine for manufacturing splints for matches.

According to the invention the splint is produced in one cycle of operations from a cylinder of wood by forming cuts in the circumference of the rotating wooden cylinder, these cuts being made in radial direction and parallel to the axis of rotation and to a depth and at a distance one from another corresponding to the thickness of the splints to be produced. The circumferential layer thus provided with cuttings is then peeled off whereas the cut pieces fall off individually in the form of match splints. The axial length of the wooden cylinder can be exactly the length of the matches or a multiple thereof. In the latter case special separating knives may be provided for making cuts in the circumferential direction of the wooden cylinder. The axial distance of these cuts corresponds to the length of the splints of matches to be produced.

The machine according to the present invention for manufacturing the splints comprises a device for exchangeably clamping and rotating the wooden cylinder, further a splitting knife adapted to be moved simultaneously in radial direction relatively to the wooden cylinder and in circumferential direction thereof. The arrangement also embodies a peeling knife which is placed in a tangent-plane to the wood cylinder and means are provided for moving said knives relatively to the wood-cylinder in such a way that with constant circumferential speed of the wood-cylinder the number of the operating strokes of the splitting knife is also constant.

One example of the machine forming part of the present invention is represented on the accompanying drawings.

Fig. 1 is a side-elevation of the machine partly in sections.

Fig. 2 an end view thereof.

Fig. 3 a top plan view of this machine.

Fig. 4 is an enlarged view in vertical section of one of the knife carrying slides of the machine.

Fig. 5 is a partial end view of the slide shown in Fig. 4 with the cover plate removed.

Fig. 7 shows diagrammatically the electric connections for controlling the motor-speed gear.

Figure 1:
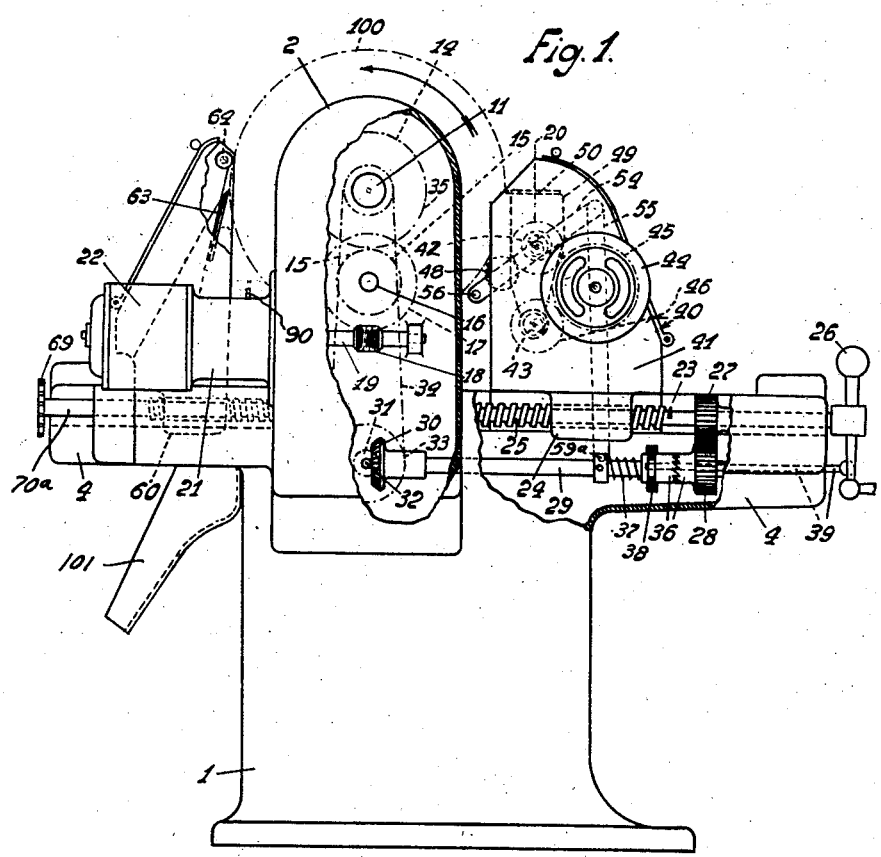
Figure 2:
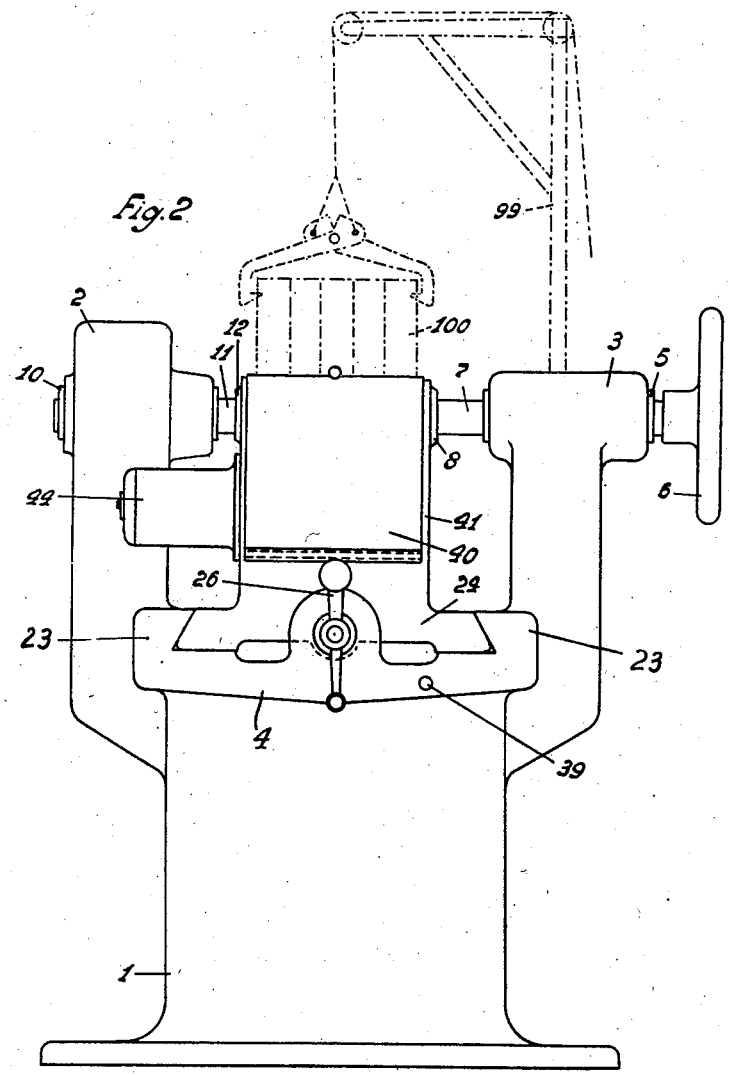

The machine represented comprises a foot 1 with two pillars 2, 3 on its side and a table 4 between these pillars. In the pillar 3 there is mounted a bearing 5 for a spindle 7 adapted to be displaced in axial direction by means of a spur wheel 6. The spindle 7 carries a head 8 with two points 9, this head being rotatable on the spindle. The pillar 2 carries a bearing 10 wherein a shaft 11 is rotatably mounted. This shaft 11 also carries a head 12 with points 13. On the spindle 11 there is mounted a toothed wheel 14 engaging with a toothed wheel 15 on a shaft 16 mounted in the pillar 2. Said shaft 16 carries further a worm wheel 17 co-operating with a worm 18 mounted on a shaft 19 driven by a speed-changing gear 21 connected with an electric motor 22. This motor is placed on the table 4 on the side of the pillar 2. The change speed gear 21 is of a known type in which the speed variations are effected by rotation of a control shaft 90 shown in Figs. 1 and 7.

The table 4 is provided with a guide 23 wherein a slide 24 can be displaced by means of a threaded spindle 25. A hand operated crank 26 on one end of this spindle and a toothed wheel 27 engaging a toothed wheel 28 on a shaft 29 are provided for selectively rotating the spindle 25. A shaft 29 rotatably mounted on said table 4 carries on one of its ends a bevel spur wheel 30 engaging a bevel wheel 31 on a shaft 32 mounted on the pillar 2. A chain wheel 33 mounted on this shaft 32 is connected with a wheel 35 by means of a chain 34, this wheel 35 being fixed on the shaft 11. The toothed wheel 28 is loosely mounted on the shaft 29 and adapted to be coupled therewith by means of a coupling 36. A spring 37 tends to hold the coupling 36 in its coupling position and a lever 38 hinged on one side on the machine-frame can be moved, by means of a rod 39 engaging the free end of the lever 38, in such a manner that the coupling is disconnected.

The slide 24 carries a casing 40 with two side-walls 41 wherein two shafts 42 and 43 are rotatably mounted, Fig. 4. A motor 44 mounted outside the casing 40 on the side-wall 41 thereof carries a toothed wheel 45 engaging with toothed wheels 20 and 46 respectively mounted on the shafts 42 and 43 journalled in the casing 40. Each of said shafts carries further a plurality of eccentrics 47 and 48 respectively which are keyed on their shafts in angularly displaced relation relatively one to another. On each pair of eccentrics 47 and 48 disposed one above the other is mounted a carrier 49 for a splitting knife 50. These knives are fixed to slides 51 separately adjustable in guides on the upper part of the carriers 49 by threaded spindles 52a. The slides 51 are provided with an indicator (not shown) movable over a scale of the guide. The joint effect of the eccentrics 47 and 48 is to impart a compound movement to the knives 50, one component of which is in a direction substantially radially of the axis of the log and the other in the circumferential direction of said log. For this purpose the lower eccentric related to one of the carriers 49 is mounted to turn in a circular strap 49a on the bottom of the carrier while the associated upper eccentric 48 is rotatable in a guide block 52 slidably received in guides 53 in the upper open portion of each carrier.

Near the ends of the shaft 42 two-armed levers 54 are rockably mounted, one end of these levers 54 being connected with the table 4 at 54a, Figs. 4 and 5 by means of a rod 55 while the other ends are connected together by a rod 56. A shaft 57 which carries cutters 58 in distances of five centimeters one from another is journalled in the levers 54 and provided with a toothed wheel 59 engaging the toothed wheel 20 on the shaft 42. By means of the connection 54a—55 between the table 4 and the levers 54, the angular position of the latter is shifted as the slide 24 approaches the log and thus the cutters are maintained in proper cutting position irrespective of the constantly decreasing diameter of the log. The cutters 58 form circumferential cuts in the log at points spaced axially thereof distances corresponding to the length of the matches to be cut.

On the end of the table 4 opposite that carrying the casing 40, there is displaceably mounted in the guidings 23 a second slide 60. A left hand threaded portion of the spindle 25 displaces the slide 24 and a righthand-threaded portion on the other end of the spindle 25 displaces the slide 60. Thus the two slides 24 and 60 always move towards or away from one another when the spindle 25 is rotated.

The slide 60 carries a peeling knife 63 and a log engaging guide roller 64.

Figure 3:
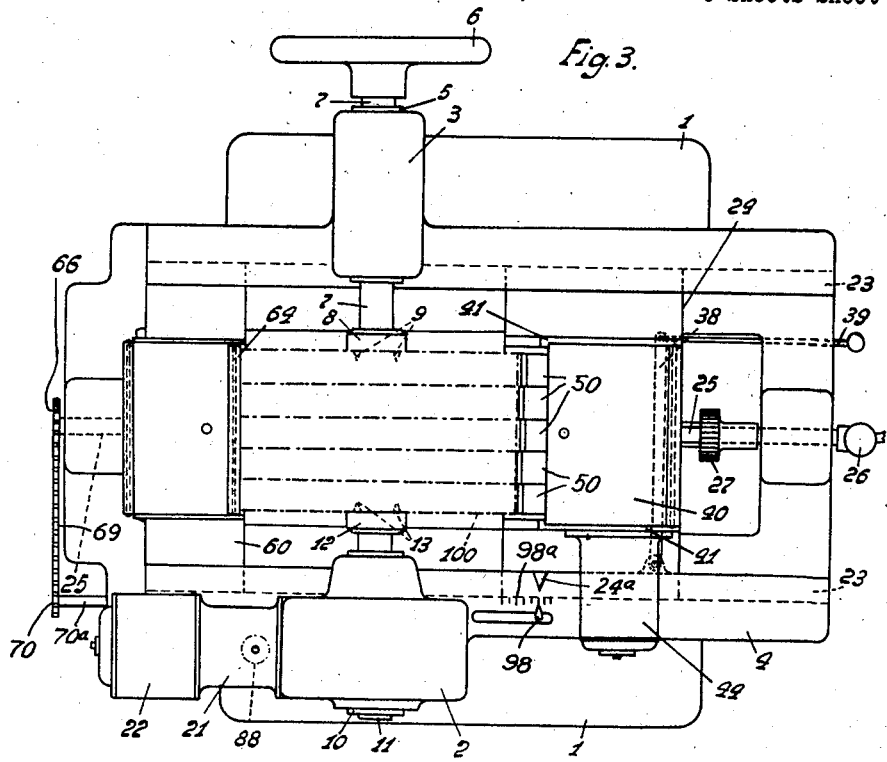
Figure 6:
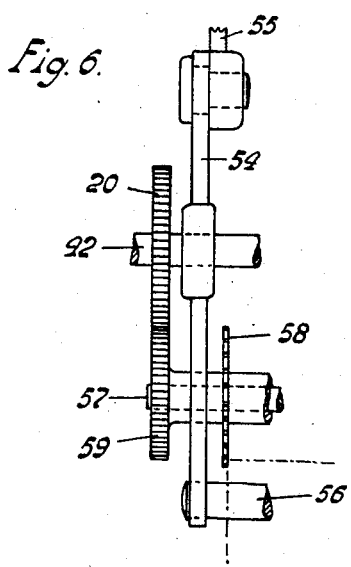
Fig. 6 represents a detail of the same slide on a larger scale.

The control mechanism for the change speed gear 21 is conveniently located within the table 4 and is actuated by the spindle 25 on the end of which opposite the crank 26 there is mounted a chain-wheel 66 (Figs. 3 and 7) the rotation of which is transmitted to a chain wheel 70 by means of a chain 69. On the shaft 70a of the chain wheel 70 there is mounted a worm 71 engaging a worm wheel 72. The extremity of the worm-wheel carries two cam disks 73 on the circumferences of which noses 74 are engaged, these noses being provided each on one spring of a pair of contact-springs 75. These cam disks 73 are provided with notches the distance one from another of which decrease in one circumferential direction, namely in the working direction.

The contact-springs 75 are connected in series with another pair of contact springs 76 by conductors 75a and the several conductors and contact springs are connected in a circuit 77—79—80 in which a motor 78 is interposed. The shaft of the motor 78 carries a worm 81 engaging a worm wheel 82, the shaft 83 of which carries a cam 84 which at each half revolution of the shaft 83 closes one or the other of the contacts of the pair of contact-springs 76.

On the upper extremity of the shaft 83 is fixed a chain-wheel 85 which, by means of a chain 87, is connected with a chain-wheel 88 secured to the shaft 90 (Fig. 1) which by its rotation adjusts the change speed gearing 21 interposed between the motor 22 and the worm 18.

A bevel toothed wheel 89 on the control shaft 90 of the chain-wheel 88 engages a toothed wheel 91 on a shaft 92 which carries a conical roller 93 on which a helicoidal groove is provided. According to the direction of rotation of the roller 93 a wire-rope 94 is wound on or off, this wire-rope running over guiding-rollers 95 and 96 on the table 4. The end of this rope carries a weight 97 which keeps the rope constantly tensioned. On this rope 94 is fixed a pointer 98 running over a scale 98a on the table 4. On the slide 24 there is fixed another pointer 24a running over said scale on the table 4.

To the machine-frame is firmly attached a crane 99 by means of which the wood-cylinders 100 from which the splints are to be formed can be brought to position in the machine.

The machine described above works as follows:

The wood-cylinder 100 is brought between the heads 8 and 12 by means of the crane 99 and by rotating the hand-wheel 6 it is clamped between said heads. By operating the lever 38 by means of the rod 39 the clutch 36 is now disconnected. Now the hand-crank 26 and with it the spindle 25 can be rotated until the knives 50 and the knife 63 lie near the circumference of the cylinder 100.

Now the coupling 36 is engaged and the motors 22 and 44 are set in operation. In consequence thereof the cylinder 100 begins to rotate in the direction of the arrow and the knives 50, under the action of the eccentrics 48 move in radial direction towards the cylinder and simultaneously in the direction of its circumference due to the action of the eccentrics 47. The position of the eccentrics 47 and 48 relatively to one another is chosen so that the eccentric 47 controls the movement of the knives 50 in the direction of rotation of the cylinder while the eccentric 48 moves the knives radially whereby cuts are made into the circumference of the cylinder (Fig. 4). The movement of the knives 50 in the direction of rotation of the cylinder 100 prevents woodshaving from being torn off. As the knives reach the lower limit of their movement, they are withdrawn from the log 100 by the eccentrics 48 and simultaneously raised by the eccentrics 47.

Simultaneously with the rotating of the toothed wheels 20 and 46 by means of the toothed wheel 45 on the motor-shaft 44, which produces the rotation of the eccentrics, also the shaft 57 rotates with the cutters 58 because the toothed wheel 20 engages with the toothed wheel 59. Thereby the cutters cut grooves into the circumference of the cylinder 100 at distances corresponding to the desired length of the matches and at the same time the two outermost cutters on the shaft 57 cut the side-flanks of the cylinder.

On the other side of the machine the knife 63 peels off from the cylinder a wood-layer of a thickness equal to the thickness of the matches, and approximately corresponding to the depth of cut of the knives 50, and the ready match-splint falls at this place from the machine through a chute 101.

The motor 22 which, by way of the worm 18, the worm-wheel 17 and the toothed wheels 15 and 14, rotates the wood-cylinder, also rotates the bevel-wheels 31 and 30 by means of the chain-wheel on the shaft 11, the chain 34 and the chain-wheel 33. Thereby the shaft 29 is rotated and the toothed wheel 28 mounted thereon drives the toothed wheel 27 on the spindle 25.

Rotating of the spindle 25 effects—by means of the left-hand and the right-hand thread thereon—displacement of the two slides 24 and 60 towards the wood-cylinder 100 so that the knives 50, the cutters 58 and the peeling-knife 63 cut into the cylinder always to the same depth, that is to the thickness of the splint.

The circumferential speed of the cylinder is maintained constant, regardless of decreasing of the diameter of the cylinder, by the control device according to Fig. 7 the details of which have been omitted in the other figures. The rotation of the chain-wheel 66 is transmitted to the chain-wheel 70 by means of the chain 69. Thereby the worm 71 is rotated and the worm-wheel 72 with its shaft and the cam disks 73 rotate. Each time an elevated portion of cam disks 73 passes the noses 74 the contact between the pairs of springs 75 is closed. The electric motor 78 receives thereby current over the circuit 77—79—80 by way of one of the contacts of the pair of contacts 75 and one of the contacts between the pairs of contact 76 and begins to rotate. The worm 81 on the shaft of the motor 78 drives the worm-wheel 82 and therewith the shaft 83 with the cam 84 and the chain-wheel 85. Now by means of the chain 87 and the chain-wheel 88 the wheel 85 drives the control shaft 90 which directly adjusts the speed gearing 21 and increases thereby the circumferential speed of the cylinder. The cams on the disks 73 are so arranged that upon initiation of operation of the machine the distance between the cams is relatively large but this distance decreases in the direction of rotation of the disks and the contact springs 75 are actuated at a higher frequency as the log is peeled down and the diameter thereof decreases.

A conventional form of change speed gearing 21 is illustrated in Fig. 7 consisting of a friction drive wheel 100 driven by the motor 22 through beveled gear wheels 101 and a shaft 102. The friction wheel 100 is engaged with the face of a driven friction wheel 103 attached to the shaft 19 and by adjusting the friction wheel 100 longitudinally along the shaft 102 the relative speed of the shafts 19 and 102 may be varied as desired. Adjustment of the friction wheel 100 is effected by an arm 104 attached to a shaft 105 driven by the shaft 90 through a worm drive 106.

The cam 84 on the shaft 83 is designed to stop the motor each time it has made half a revolution. A separate switch (not shown) closes the circuit of the motor 78 for this half revolution as soon as the cam 84 has left the pair of contact-springs 76 which had been closed by the cams at switching in, said closing being maintained until the other pair of contact-springs 76 closes its contact. In the meantime the noses 74 have left the cams on the disks so that at the pairs of contact 75 the circuit of the motor is interrupted.

The rotation of the shaft 90 being a measure for the number of splints produced it can be utilized for indicating this number. For this purpose the toothed wheels 89 and 91 are provided. In rotating them the wire-rope 94 is wound upon the conical roller 93 and the pointer 98 is displaced along the scale 98a.

In order that the peeling-knife will always have the same cutting-depth the roller 64 is provided which runs on the circumference of the cylinder 100.

What I claim is:

1. A machine for manufacturing splints for matches comprising means for rotatably supporting a wood log, a knife for circumferentially peeling the log, at least one splitting knife having a cutting edge, means for imparting compound movement to said knife one component of which is radially of the log and the other parallel to its cutting edge and circumferentially of said log, a carrier for said splitting knife, a drive gear for rotating the wood log and simultaneously advancing the carrier and the splitting knife toward said log, and means for controlling said drive gear to maintain the circumferential speed of the log constant with respect to the velocity of movement of said splitting knife as the diameter of the log is decreased by the cutting action of the peeling knife.

2. A machine for manufacturing splints for matches comprising means for rotatably supporting a wood log, a knife for circumferentially peeling the log, at least one splitting knife having a cutting edge, means imparting compound movement to said knife one component of which is radially of the log and the other parallel to its cutting edge and circumferentially of said log, a carrier for the peeling knife, a carrier for the splitting knife, a feed member common to the several carriers and operable to simultaneously advance said carriers toward the log, a drive gear for rotating the log and operating said feed member, and means for controlling said drive gear to maintain the circumferential speed of the log constant with respect to the velocity of movement of said splitting knife as the diameter of the log is decreased by the cutting action of the peeling knife.

3. A machine for manufacturing splints for matches comprising means for rotatably supporting a wood log, a knife for circumferentially peeling the log, at least one splitting knife having a cutting edge, means imparting compound movement to said knife one component of which is radially of the log and the other parallel to its cutting edge and circumferentially of said log, a carrier for the peeling knife, a carrier for the splitting knife, a feed member common to the several carriers and operable to simultaneously advance said carriers toward the log, a motor for rotating the log and actuating the carriers to simultaneously advance said carriers toward said log, and control means interposed between the motor and said log to maintain the circumferential speed of the log constant with respect to the velocity of movement of said splitting knife as the diameter of the log is decreased by the cutting action of the peeling knife.

4. A machine for manufacturing splints for matches comprising means for rotatably supporting a wood log, a knife for circumferentially peeling the log, at least one splitting knife, a carrier for said splitting knife, a drive gear for rotating the wood log and simultaneously advancing the carrier and splitting knife toward said log, a cam for imparting movement to said splitting knife in a direction radially of the log, a second cam for imparting movement to said splitting blade in the direction of the circumference of said log, and means for controlling said drive gear to maintain the circumferential speed of the log constant with respect to the velocity of movement of said splitting knife as the diameter of the log is decreased by the action of the peeling knife.

5. A machine for manufacturing splints for matches comprising means for rotatably supporting a wood log, a knife for circumferentially peeling the log, at least one splitting knife having a cutting edge, means for imparting compound movement to said knife one component of which is radially of the log and the other parallel to its cutting edge and circumferentially of said log, a carrier for the peeling knife, a carrier for the splitting knife, a feed member common to the several carriers and operable to simultaneously advance said carriers toward the log, a drive gear for rotating the log and operating said feed member, means for controlling said drive gear to maintain the circumferential speed of the log constant with respect to the velocity of movement of said splitting knife as the diameter of the log is decreased by the cutting action of the peeling knife, said feed member including a spindle having oppositely pitched screw threads at the ends thereof engaging said carriers for imparting movement thereto.

6. A machine for manufacturing splints for matches comprising means for supporting and rotating a wood log, a splitting knife adapted to produce cuttings in the circumference of said log in a direction parallel to the axis of rotation thereof, and means for imparting a compound movement to said knife having one component in a direction radially of the axis of the log and the other component in the circumferential direction of said log.

7. A machine for manufacturing splints for matches comprising means for supporting and rotating a wood log, a holder, a splitting knife adjustably mounted in said holder to form cuts in the circumference of the log parallel to the axis of rotation thereof, and means for imparting a compound movement to said holder and said knife having one component in a direction radially of the axis of the log and the other component in a circumferential direction of the log.

8. A machine for manufacturing splints for matches comprising means for supporting and rotating a wood log, at least one splitting knife to form cuts in the circumference of said log, a peeling knife to peel off the portion of the log cut by said splitting knife, and eccentrics for actuating said splitting knife, said eccentrics cooperating to impart a compound movement to said splitting knife having one component in a direction radially of the axis of the log and the other component in a circumferential direction of said log.

9. A machine for manufacturing splints for matches comprising means for supporting and rotating a wood log, a series of splitting knives operable to form radial cuts in said log, a peeling knife operable to peel off the cut portion of said log, a series of rotatable cutting discs, a slide supporting said peeling knife, a supporting slide common to said splitting knives and cutting discs, a feed spindle common to the two slides for simultaneously moving the latter in opposite directions, and a pair of eccentrics for actuating each splitting knife, each pair of eccentrics cooperating to impart a compound movement to the related splitting knife having one component in a direction radially of the axis of the log and the other component in a circumferential direction of the log.

10. A machine for manufacturing splints for matches comprising means for supporting and rotating a wood log, a series of splitting knives operable to form radial cuts in said logs, a movable holder for each knife, means for adjusting each knife in the related holder, and a pair of eccentrics for actuating each holder and the related splitting knife, each pair of eccentrics cooperating to impart a compound movement to the related holder and splitting knife having one component in a direction radially of the axis of the log and the other component in a circumferential direction of the log.

LORENZ CONTRATTO.